Inventors
Arthur W. Gardiner and
John L. Goldthwaite
By Blackmore, Spencer & Flint
Attorneys

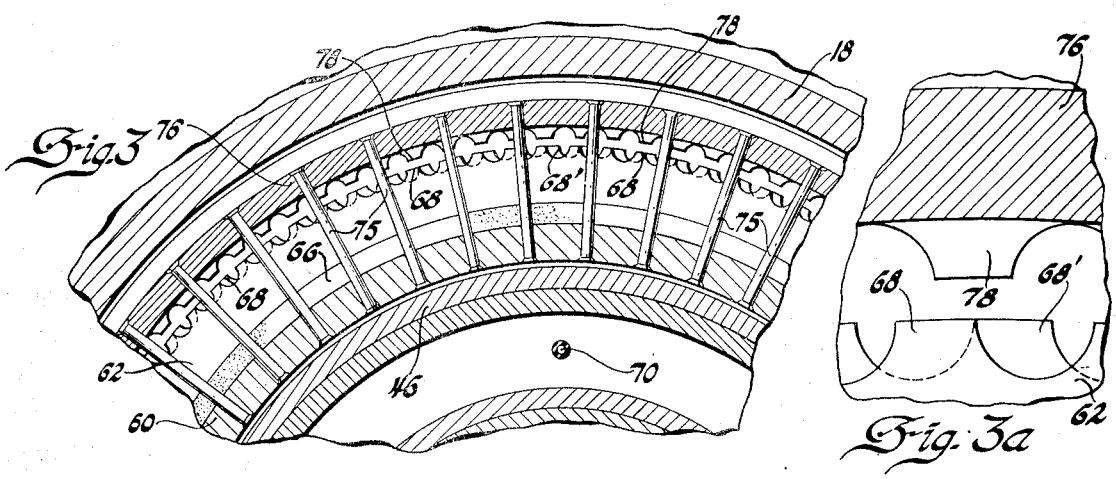
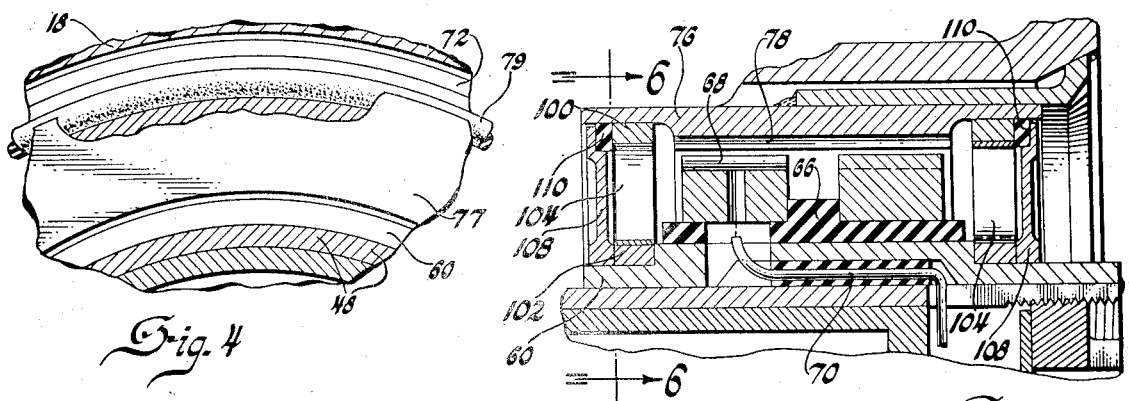
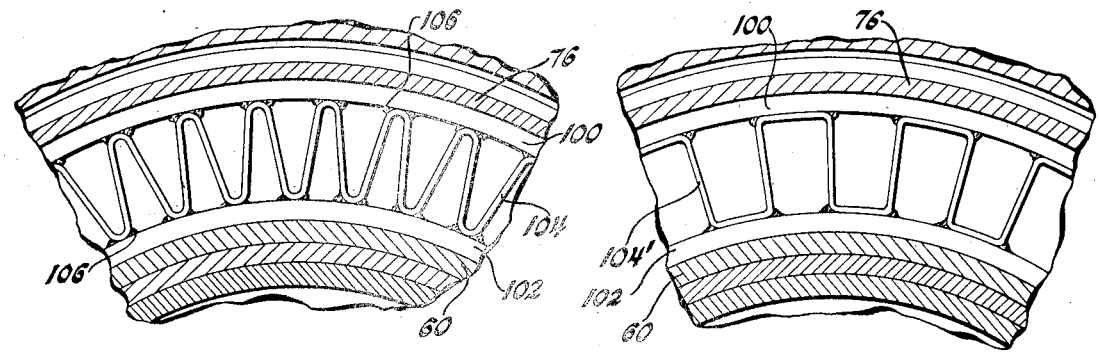

Patented Apr. 9, 1946

2,397,935

UNITED STATES PATENT OFFICE 2,397,935

TORQUE METER

Arthur W. Gardiner and John L. Goldthwaite, Indianapolis, Ind., assignors to General Motors Corporation, Detroit, Mich., a corporation of Delaware Application December 21, 1942, Serial No. 469,622

13 Claims. (Cl. 73—136)

This invention relates to means for indicating torque or load on a member and particularly to means for measuring the torque or load on a rotating shaft. It has been recognized that there are a number of instances in which it would be very desirable to be able to read the amount of load or torque which a particular rotatable shaft is transmitting at a given moment. This is particularly true in aircraft where it would be very advantageous for the pilot to be able to read on an indicating dial the load or power output on the shaft of any one of the motors on the plane. If such devices were provided, then the pilot could set the throttles and fuel flow rates to the engines so that they would develop maximum efficiency or economy of operation and therefore give the greatest distance possible on his fuel.

It is of course known that by applying a torque load to a rotatable shaft there occurs a certain amount of twist or wind-up in the shaft due to said load and that this wind-up is substantially proportional to the load. Thus by supporting separate means at a plurality of axially spaced points on a torque-carrying shaft and bringing the supported means into juxtaposition, there will be a slight relative motion therebetween upon a torque load application to the shaft and effects may be obtained from this relative motion which will vary electrical characteristics to give a desired indication. The pieces in juxtaposition may, for example, form an electrical condenser and as such when the members are moved relatively the electrical capacity therebetween will be changed and this capacity variation can through other apparatus give a desired indication. This is mentioned only as an illustration as a variation in other electrical characteristics may also be utilized.

It is therefore an object of our invention to provide means for indicating the torque produced in a rotatable shaft.

It is a further object of our invention to provide a mechanism which will indicate the torque applied to a given shaft which directly cooperates with said drive shaft.

It is a still further object of our invention to provide a torque-indicating mechanism which may be applied to the torque-carrying member with substantially no change in the construction of the member.

It is a still further object of our invention to provide such a torque measuring means which is mounted within the driving means and thus fully protected.

It is a still further object of our invention to provide a torque-indicating mechanism in which special means are provided to stabilize the mechanical positioning of parts in a manner to inhibit motion therebetween other than the motion due to torsional deflection accompanying application of the torque to be measured.

It is a still further object of our invention to provide a torque-indicating mechanism in which special provision is made to compensate for error factors by rendering the mechanism insensitive to factors other than torsional deflection of parts occasioned by application of the torque to be measured.

It is a still further object of our invention to provide mounting means for a compensated torque meter pick-up mechanism.

With these and other objects in view which will become apparent as the specification proceeds, the embodiments of our invention will be best understood by reference to the following specification and claims, and the illustrations in the accompanying drawings, in which:

Figure 3 is a partial sectional view taken on line 3—3 of Figure 2;

Figure 3a is a highly magnified view showing the relative position of the teeth in Figure 3;

Figure 4 is a partial sectional view taken on line 4—4 of Figure 2;

Figure 5 is a sectional view through the condenser supporting means showing a modified form of our invention;

Figure 6 is a sectional view taken on line 6—6 of Figure 5;

Figure 7 is a sectional view similar to Figure 6 showing a further modified form of the radial spacing means; and Figure 8 is a diagrammatic representation showing principles of operation of our invention.

Figure 1:
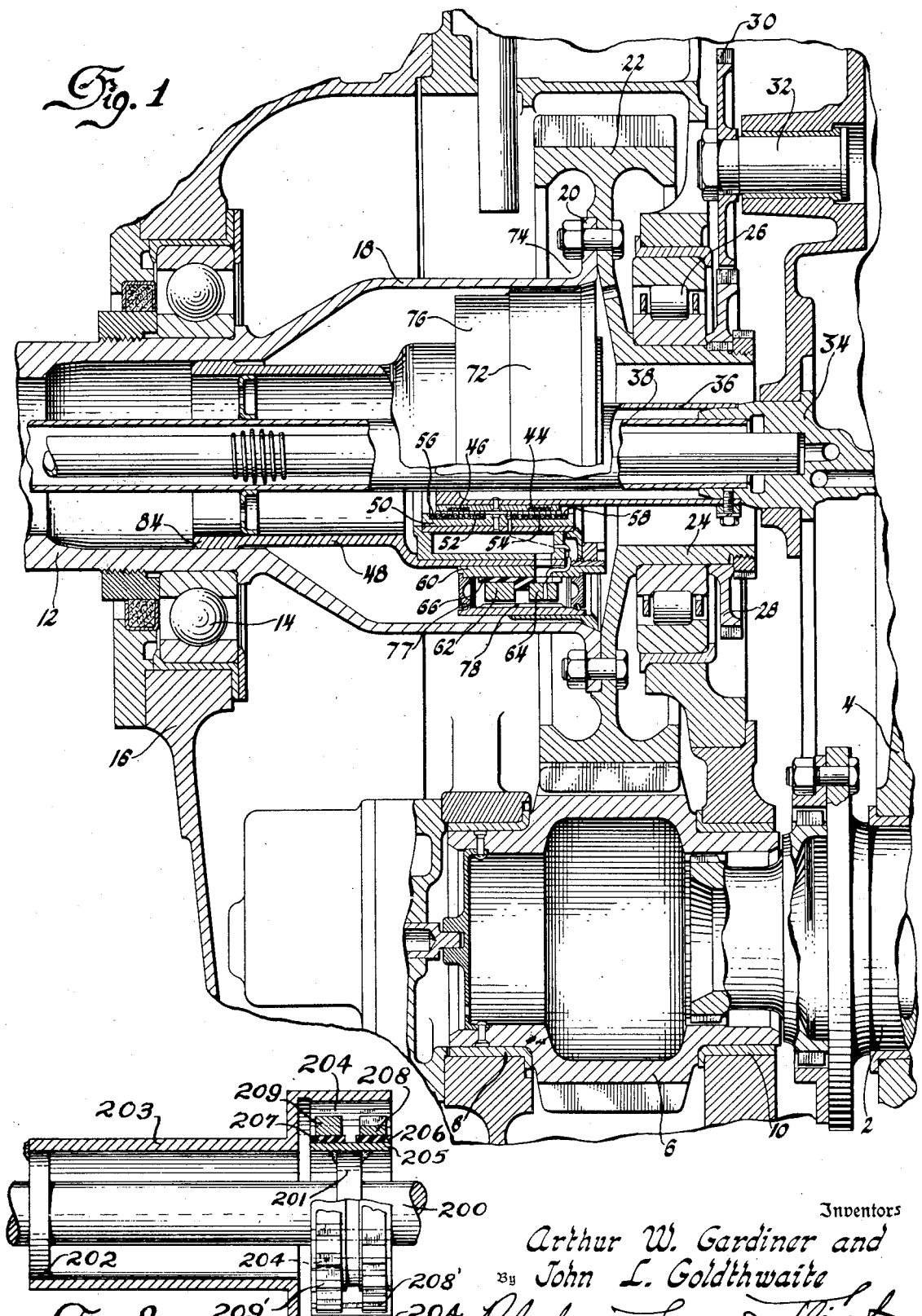
Figure 1 is a vertical section through load transfer means to an output shaft in which torque measuring means of our design is incorporated.

Referring now more specifically to Figure 1, there is therein shown a crankshaft 2 of an engine 4, which shaft drives pinion 6. This pinion is trunnioned in bearing members 8 and 10. A hollow tubular shaft 12 is rotatably supported by ball bearing 14 in the front bell housing 16, which shaft is adapted to be secured to the load which may be in the case of aircraft a driving propeller (not shown). The inner end of the shaft 12 which is within the bell housing 16 is enlarged in diameter as shown at portion 18 and the immediate inner end is flanged as at 20 and is connected to the web of a driven gear 22 which meshes with pinion 6, said gear 22 having a cylindrical portion 24 integral with the web which portion is rotatably mounted in roller bearing 26 which is in turn supported in the rear portion of the bell housing.

This cylindrical portion 24 also carries a small driving gear 28 which is adapted to mesh with a mating gear 30 mounted on a stub drive shaft 32 to propel certain auxiliary apparatus such as, for example, a speed governor for controlling propeller pitch, an electric tachometer for indicating engine or propeller speed, or any other desired part. There is thus provided from the main drive or crankshaft of the motor 4 a gear drive through pinion 6 and main gear 22 to rotate the main shaft 12 to provide power for load and at the same time power for auxiliary apparatus.

Secured to the fitting 34, in turn supported in the bell housing, is stationary sleeve 36, the outer end of which has a bearing upon an inner rotating sleeve 38 which connects to and rotates with shaft 12 (connection not shown) and has at the rear a bearing in fitting 34. This stationary outer sleeve 36 carries adjacent its outer end a cylindrical member having provided therein a plurality of spaced circular grooves 40 and 42 in which are wound a plurality of insulated pick-up coils 44 and 46 respectively. These pick-up coils are individually connected to cables which are led back into the bell housing and eventually are connected to desired power source and indicating apparatus. Within the enlarged end 18 of the shaft 12 there is carried the rotating apparatus of the pick-up mechanism and the other portion of the electric circuit, including two variable condensers, all of which rotates with the shaft, the current changes in which circuits are picked up by the two coils 44 and 46. This rotating apparatus includes a comparatively large sleeve 48 which is rigidly secured to the inner surface of the shaft 12 at 84 and extends back toward the engine in the enlarged portion of the interior of the shaft. It carries on its inner surface an insulating cylindrical member 50 having therein a plurality of spaced grooves 52 and 54 in which are wound rotary transformer coils 56 and 58 which are adapted to cooperate respectively with stationary coils 46 and 44 and provide therewith two independent rotating transformer pairs, whereby variations in current flowing in one coil of one pair induces a like proportionate variation in the current flowing in the mating coil of that pair, whereby by using alternating current in the circuits, energy may be transferred between a non-rotating and a rotating part without any mechanical connection such as brushes or slip rings therebetween, thus making for stability and durability of the torque measuring apparatus without the need for frequent attention to and maintenance of sliding contacts. Fixedly carried on the outer surface of the sleeve 48 is a cylindrical supporting means 60 which supports a plurality of circular toothed members 62 and 64 which are in the form of rings tightly shrunk onto supporting sleeve 60 and thus adapted to rotate in unison therewith. These are electrically insulated from each other and from the outer surface of the cylindrical member 60 by an insulating drum 66. They have cut in their outer surfaces a plurality of axially extending teeth 68 and 68' for purposes to be described and each of these insulated rings is electrically connected through a cable 70 and 71 to the coils 56 and 58.

Figure 2:
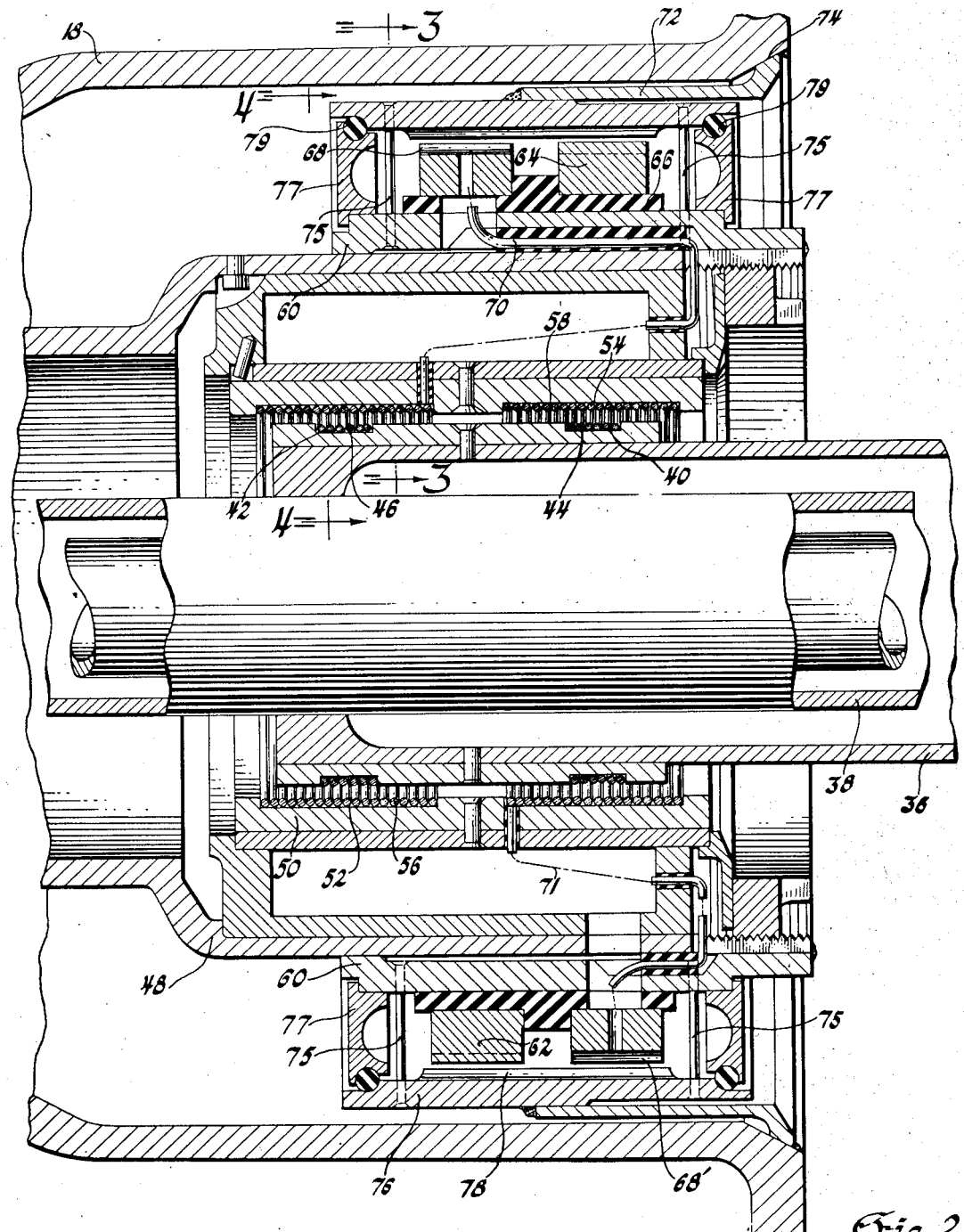
Figure 2 is an enlarged sectional view through the torque measuring means per se.

Also secured to the inner surface of the innermost portion of the shaft section 18 is a short thin walled cylindrical member 72 which is shown as connected thereto at 74 and which extends parallel to the inner surface of the shaft section 18 and carries in turn on its inner surface a cylindrical drum 76 having a series of axial teeth or ribs 78 which extend in parallelism to the teeth 68 and 68' on the annular rings 62 and 64. The concentric cylindrical drums 60 and 76 are thus carried by rigid connections at spaced points 74 and 84 on the main shaft 12 so that the application of load and the resultant twist or wind-up of the shaft will produce relative rotation between the two. In order to provide a sufficiently rigid assembly between the concentric drums 60 and 76 and at the same time allow some relative rotation, a series of radial spokes 75 are applied therebetween at intervals around the periphery and spaced a short distance inwardly at each end. These spokes are firmly attached to each of the drums as, for instance, by welding, soldering, or otherwise firmly fixed. The two drums are thus maintained a fixed distance apart, are prevented from having radial movement with respect to each other, but may have the small relative rotation necessary. In the annular end opening at each side between the two drums there are inserted sealing rings 77 which are forced into the openings adjacent the spokes and press tightly against circular rubber rings 79 to complete the closure. The rubber rings close the opening, but do not prevent the relative rotation of one drum with respect to the other. It is also to be noted that these two parts 60 and 76 carry the toothed members as best shown in Figures 2 and 3, where it may be seen that the inner insulated rings 62 and 64 form two condenser pairs with the common grounded outer ring 76, and that the electric condenser capacity of a pair is determined mainly by the small juxtaposed portions of the circumferential surfaces of the mating teeth. The outer toothed member 76 is electrically connected to the engine frame and thus to ground and the inner toothed rings are insulated electrically from each other and from the engine and electrical energy or potential is supplied through the cables 70 and 71, the circuit being completed through the ground connection. Thus by providing current to the primary coils 44 and 46, a current is induced in the secondary coils 58 and 56 which impress a certain potential upon the annular rings 62 and 64 relative to grounded member 76 to provide a certain capacity between the teeth 68, 68' and 78.

Since these mating sets of teeth are normally in a certain spaced relation with respect to each other, there will be no change in the capacity between them when the shaft is stationary or when it is rotated under no load. However, when the torque load is applied to the shaft there will be a certain amount of twist or wind-up and therefore the incremental portions along the shaft will assume different angular positions. Since, therefore, the upper set of teeth forming one plate of the condenser is secured to the shaft at point 74 and the inner sets of teeth 68 and 68' are supported by the cylindrical sleeve 48 at point 84 which is axially spaced considerably from point 74, there will be a certain amount of relative twist applied between these two points and the teeth 68 and 68' will be moved circumferentially with respect to the teeth 78. This will cause a change in the capacity of the two condenser sets, which changes when introduced into a bridge or similar circuit, will result in an indication at the remote indicating means.

In Figures 5, 6 and 7 are shown modified ways in which the two concentric drums 60 and 76 upon which the toothed members are mounted may be spaced apart so that there will be no undesired movement between the two. In the design shown in Figures 5 and 6 there are provided a pair of rings 100 and 102. These rings are interconnected at spaced points throughout their inner and outer peripheries respectively by a continuous bent thin strip member 104 which zigzags back and forth between the two rings and is welded or brazed to each at the peak of the loop as shown at 106. An assembly formed of the rings and strip or strut connectors is inserted in each end of the space between the drums which space is then sealed by a circular cover 108 which has a rubber ring 110 adjacent one edge to complete the seal. Thus the enclosure in which the condenser teeth are located is protected and at the same time the two parts may move relatively in rotation due to the flexibility of the thin strip connectors and the rubber rings 110.

The strip connectors 104 are shown in Figure 6 as having the shape of a hairpin or expanding loop. They may of course have other configurations and there is shown in Figure 7 a square stepped one 104' in which the strip extends radially from one ring to the other in substantially a straight line and then along the surfaces of one of the rings and back to the other to provide a maximum of radial rigidity and a minimum of resistance to torsional movement. Here again it is welded to the rings to provide a unit assembly and is assembled to the general mechanism in the same manner as previously described.

Figure 2A:
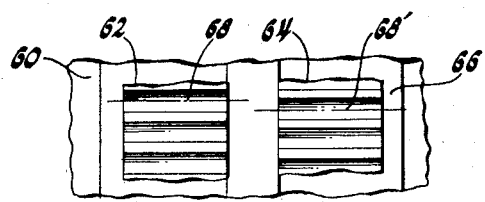
Figure 2a is a top detail view of the longitudinal teeth.

Figure 8 represents the principle of operation of the torque pick-up described at length above, but for simplicity the pick-up is shown mounted outside a shaft 200 having flanges 201, 202. Unstressed sleeve 203 carrying circumferentially spaced, axially disposed radial teeth 204 is secured to and supported by flange 202. Mounted on flange 201 is a support sleeve 205 carrying insulating rings 206, 207, in turn supporting toothed inner rings 208, 209. Application of torque to shaft 200 will obviously cause relative torsional motion between the outer and inner toothed rings and a change in capacity of the two independent condenser sets formed by the mating teeth as heretofore described. It is emphasized for reasons to be described that the centerline of teeth 208' and 209' of the inner rings are disposed on opposite sides of the centerline of teeth 204 of common mating element of the condenser pairs as shown in dash and dot lines in Figure 2a. This illustrates diagrammatically the construction of the torque meter described in detail previously.

There are of course certain error factors which may cause unwanted changes in the capacity of the condenser pairs thus giving rise to a false indication of torque. For instance, mechanical positioning of parts forming a condenser pair may be altered by factors other than torque deflection in the shaft, such as by differential expansion or contraction of parts, stray parastic deflection of condenser parts due to bending of the torque-carrying shaft. Also, condenser capacity may be altered by factors causing change in dielectric strength of the space between mating condenser parts, such as by change in air density or temperature or in the amount of oil or oil vapor in this space.

To mitigate the effect of these error factors, special provision has been made as described for maintaining condenser parts in rigid radial relationship by means of the symmetrically disposed double radial spacing means, by cushioning the immediate condenser assembly against heavy radial forces by use of thin-walled drive sleeve thus reducing the amount of force causing stray deflections within the condenser per se and by sealing the condenser chamber against ingress of oil or foreign matter. In addition, further compensation is provided by using multiple condenser pairs so arranged in juxtaposition in a common environment and so disposed and connected to the electrical bridge that a change in torsional deflection causes a change in electric capacity of approximately like amount, but of opposite sign, in each of the two condenser pairs, whereas a change due to error factors causes a change in capacity of approximately like amount and of like sign in each of the two condenser pairs. Connections to the bridge are such that the effect of capacity changes of opposite sign is additive, whereas changes of like sign tend to be nullified.

By maintaining two condenser pairs closely and symmetrically spaced in a common environment, change in dielectric of the space between mating parts will, to a high order of probability and barring the chance selective introduction of some disturbing foreign particle into one of the pair only, affect each pair a like amount. Or, if the effect on each pair is not of like amount, the net effect appearing as an error in the torque indication is only that due to the differential of the individual effects.

By maintaining the two condenser pairs closely and symmetrically disposed in the same environment, stray deflections or differential expansions will to a high order of probability occur equally in each, and again, if not equal, the error effect is differential. The likelihood of error factors causing an important parasitic deflection in a torsional sense is very remote.

As noted, the key premise to error compensation in the pick-up mechanism is to render it relatively insensitive to all factors except torsional deflection by providing condenser pairs in even multiples and by arranging that torque changes cause additive effects and error factors cause differential effects in the electric measuring bridge.

To this end, and as shown in Figures 3, 3a and 8, the condenser teeth, the mating faces of which largely control capacity of the condenser pair, are symmetrically disposed on opposite sides of the centerline of the common mating tooth, such that relative rotation causes capacity changes of approximately like amount but of opposite sign in the two pairs; that is, as the face of one tooth tends to move into alignment with the mating tooth with which it forms a condenser and thereby increases the capacity, the opposite tooth of the other pair is moving away from its mating tooth and decreasing the capacity therewith. Also, since both condenser sets have full rotational motion, the sensitivity, compared to a single condenser pair, is doubled, thus halving the relative influence of any residual effects due to error factors.

The foregoing description demonstrates that by provision of the noted construction, by the use of compensating means and by increasing the sensitivity of the pick-up mechanism, the relative effect of error factors is so reduced as to render it feasible to measure torque accurately by measuring small torsional deflections even in the presence of parasitic deflections of a like order or magnitude.

This same system is utilized in the principal construction shown herein where the single set of grounded teeth 78 cooperate with both sets of insulated teeth 68 and 68'. As clearly shown in Figure 2a, the teeth 68 and 68' on the two rings are not in axial alignment, but are displaced circumferentially a distance approximating the width of a tooth as shown by the dot-and-dash lines. In this manner any relative motion between the outer ring 76 and the inner ring 60 will cause an increase in capacity between teeth 68 and 78 and a similar decrease between teeth 68' and 78. These will of course be connected back through rotary transformers 46—56 and 44—58 through lines 70 and 71 and thence to a measuring bridge.

At the same time any uneven expansion of parts due to temperature changes which tend to increase or decrease the gap between teeth 68 and 68' and teeth 78 will affect each in the same manner and thus compensate and no erroneous indication will be given by the bridge. Likewise, any change in the dielectric between the teeth will be compensated for.

It is therefore seen that we have provided means whose electrical characteristics are altered by relative mechanical movement, the same provided by the twist between spaced portions in a rotatable member and said change being proportional to the load applied to the rotatable member.

We claim:

1. In means for detecting the torsional stress applied to a hollow cylindrical body, a tubular member mounted within the body and rigidly secured thereto, a series of teeth on the internal surface of said member, a second member also located within the body and rigidly secured to an axially spaced point but extending within the first member, toothed means carried by the external surface of the second member adapted to lie in juxtaposition to the teeth on the first member forming electrical condensers therewith whereby the teeth on the two members will move relative to each other when torque is applied to the body changing the capacity of the condensers.

2. In means for detecting the torsional stress applied to a rotating body, a pair of concentric radially spaced drums separately secured at axially spaced points to the body, a series of land and groove portions on the contiguous faces of the drums whereby a condenser is formed therebetween and resilient means interconnecting said drums to prevent relative radial displacement but permit relative rotary movement.

3. In means for detecting the torsional stress applied to a rotating body, a pair of concentric radially spaced drums separately secured at axially spaced points to the body, a series of land and groove portions on the contiguous faces of the drums whereby a condenser is formed therebetween, resilient means interconnecting said drums to prevent relative radial displacement but permit relative rotary movement, and deformable sealing means applied to the end spaces between the drums.

4. In means for detecting stress applied to a body, a pair of concentric radially spaced drums separately secured at spaced points to the body, a series of toothed portions carried by the contiguous faces of the drums forming a condenser pair and means interconnecting said drums to allow relative rotary motion but prevent relative radial motion.

5. In means for detecting stress applied to a body, a pair of concentric radially spaced drums separately secured at spaced points to the body, a series of toothed portions carried by the contiguous faces of the drums forming a condenser, means interconnecting said drums to allow relative rotary motion but prevent relative radial motion, and sealing means applied to the end spaces between the drums.

6. In means for detecting the torsional stress applied to a rotating body, a pair of concentric radially spaced drums separately secured at axially spaced points to the body, a series of land and groove portions on the inner surface of the outer drum, an insulating cylinder around the outer surface of the inner drum, conductive rings mounted upon the insulating cylinder and having land and groove portions adjacent those on the outer drum and forming therewith electrical condensers.

7. In means for detecting the torsional stress applied to a rotating body, a pair of concentric radially spaced drums separately secured at axially spaced points to the body, a series of land and groove portions on the inner surface of the outer drum, an insulating cylinder around the outer surface of the inner drum, conductive rings mounted upon the insulating cylinder and having land and groove portions adjacent those on the outer drum and forming therewith electrical condensers, and resilient means extending between the two drums spaced both peripherally and axially whereby the drums and their land and groove portions may move relatively in rotation but not radially.

8. In means for detecting the torsional stress applied to a rotating body, a pair of concentric radially spaced drums separately secured at axially spaced points to the body, a series of land and groove portions on the inner surface of the outer drum, an insulating cylinder around the outer surface of the inner drum, conductive rings mounted upon the insulating cylinder and having land and groove portions adjacent those on the outer drum and forming therewith electrical condensers, resilient means extending between the two drums spaced both peripherally and axially whereby the drums and their land and groove portions may move relatively in rotation but not radially, and sealing means inserted into the end spaces between the drums.

9. In means for detecting the torsional stress applied to a rotating body, a pair of concentric radially spaced drums separately secured at axially spaced points to the body, a series of land and groove portions on the inner surface of the outer drum, an insulating cylinder around the outer surface of the inner drum, conductive rings mounted upon the insulating cylinder and having land and groove portions adjacent those on the outer drum and forming therewith electrical condensers, and a plurality of resilient rods extending between the two drums to relatively support the same.

10. In means for detecting the torsional stress applied to a rotating body, a pair of concentric radially spaced drums separately secured at axially spaced points to the body, a series of land and groove portions on the inner surface of the outer drum, an insulating cylinder around the outer surface of the inner drum, conductive rings mounted upon the insulating cylinder and having land and groove portions adjacent those on the outer drum and forming therewith electrical condensers, stationary coils mounted within the drums, rotating coils concentric with the stationary coils and carried by the rotating body, means electrically connecting the conductive rings to the rotating coils, whereby the effect of changes in the capacity will be conducted to the stationary coils for indication.

11. In means for detecting the torsional stress applied to a rotating body, a pair of concentric radially spaced drums separately secured at axially spaced points to the body, a series of land and groove portions on the inner surface of the outer drum, an insulating cylinder around the outer surface of the inner drum, conductive rings mounted upon the insulating cylinder and having land and groove portions adjacent those on the outer drum and forming therewith electrical condensers, said land and groove portions on the rings being circumferentially phased and not in alignment with each other.

12. In means for detecting the torsional stress applied to a rotating body, a pair of concentric radially spaced drums separately secured at axially spaced points to the body, a series of land and groove portions on the inner surface of the outer drum, an insulating cylinder around the outer surface of the inner drum, conductive rings mounted upon the insulating cylinder and having land and groove portions adjacent those on the outer drum and forming therewith electrical condensers, said land and groove portions on the rings being circumferentially phased and not in alignment with each other, and resilient means extending between the two drums spaced both peripherally and axially whereby the drums and their land and groove portions may move relatively in rotation but not radially.

13. In a device of the class described, a longitudinally extending hollow member to which torsional force is applied, means having a series of land and groove portions around its internal surface mounted within the member and secured at one axial point thereto, a second means mounted within the member having similar land and groove portions around its external periphery mounted in juxtaposition to the first means forming electrical condensers therewith and connected to the hollow member at an axially spaced point from the support for the first means whereby any torsional force applied to the member will cause a twisting therein and a relative movement between the two internally supported means changing the capacity of the condensers.

ARTHUR W. GARDINER.
JOHN L. GOLDTHWAITE.